United States Patent [19]

Nemoto et al.

[11] Patent Number: 4,779,956

[45] Date of Patent: Oct. 25, 1988

[54] DRIVING CIRCUIT FOR LIQUID CRYSTAL DISPLAY

[75] Inventors: Yukio Nemoto, Kanagawa; Koushiro Takahashi; Masaki Hosono, both of Fujisawa; Hiroshi Kitahara, Chigasaki, all of Japan

[73] Assignee: Matsushita Electric Industrial Co., Ltd., Kadoma, Japan

[21] Appl. No.: 861,578

[22] Filed: May 9, 1986

[30] Foreign Application Priority Data

May 10, 1985 [JP] Japan .................................. 60-99816

[51] Int. Cl.[4] .......................... G02F 1/13; G09G 3/36; G09G 3/00

[52] U.S. Cl. .................................... 350/332; 350/333; 340/784; 340/811

[58] Field of Search ................ 350/332, 333; 340/784, 340/811

[56] References Cited

U.S. PATENT DOCUMENTS 4,158,860 6/1979 Irie et al. ............................ 350/333
4,319,237 3/1982 Matsuo et al. ....................... 350/333
4,427,978 1/1984 Williams .............................. 340/784
4,447,812 5/1984 Soneda et al. ....................... 340/784
4,485,380 11/1984 Soneda et al. ....................... 340/784

FOREIGN PATENT DOCUMENTS 0111298 8/1979 Japan .................................. 340/784
0153388 9/1984 Japan .................................. 340/784

*Primary Examiner*—Stanley D. Miller
*Assistant Examiner*—Trong Quang Phan
*Attorney, Agent, or Firm*—Cushman, Darby & Cushman

[57] ABSTRACT

A liquid crystal display having plural liquid crystal cells which are constituted as a matrix, each cell respectively having one transistor and being supplied with image signals by such transistors. The driving circuit for a liquid crystal display of the present invention periodically changes the polarity of the voltage of the image signals and the voltage between both terminals of the liquid crystal cell so as to switch the transistor, and the driving circuit generates gate signals which are impressed on the gate electrode of each transistor, the gate signals having a lowest voltage which is lower than a voltage obtained by subtracting the amplitude voltage of the common electrode of the liquid crystal cells from the lowest voltage in the driving voltage obtained from the image signals.

2 Claims, 6 Drawing Sheets

DRIVING CIRCUIT FOR LIQUID CRYSTAL DISPLAY

BACKGROUND OF THE INVENTION

1. Field of the Invention

The present invention relates to a driving circuit for a liquid crystal display, and especially a driving circuit for a liquid crystal display used for an LCD television set, or the like.

2. Description of the Prior Art

An active matrix type liquid crystal display has been recently put into practical use for color television sets, or the like, which has thin film transistors on every liquid crystal cell used as picture elements so as to realize a high quality display. However, the lowering of the driving voltage and reduction in the consumption of electric power by a driving circuit for the liquid crystal display have become of great importance. A conventional driving circuit for a liquid crystal display is described in the following by referring to FIG. 1, FIG. 2, FIG. 3 and FIG. 4 (*a*) to FIG. 4 (*j*).

FIG. 1 shows a constitution of a generally used matrix type liquid crystal display. In FIG. 1 a picture element is constituted by three kinds of components, namely liquid crystal cell 1, a capacitor 2 for memorizing and thin film transistor 3 (hereinafter abbreviated as TFT). Vertical lines 4 and horizontal lines 5 respectively corresponding to X-electrodes and Y-electrodes of the X-Y matrix. Each horizontal line 5 is connected to a scanning circuit 6, and each vertical line 4 is connected to a series-parallel transforming circuit 7, which transforms serial image signals of horizontal scanning into a number of X-electrode parallel image signals of a certain number of X-electrodes by sampling and holding the image signals. Vertical lines 4 and horizontal lines 5 are also connected to a common electrode 8.

FIG. 2 shows a conventional driving circuit for X-electrodes and a common electrode; FIG. 3 shows a conventional driving circuit for Y-electrodes; and FIG. 4 (*a*), FIG. 4 (*b*), FIG. 4 (*c*), FIG. 4 (*d*), FIG. 4 (*e*), FIG. 4 (*f*), FIG. 4 (*g*), FIG. 4 (*h*), FIG. 4 (*i*), and FIG. 4 (*j*) show waveforms of correspondingly alphabetized points in FIG. 2 and FIG. 3.

In FIG. 2, when a start pulse for scanning shown in FIG. 4 (*a*) is supplied to a terminal 9, the output signal of flip-flop 10 changes from "0" to "1" or changes from "1" to "0". Terminals 11 and 12 are respectively supplied with image signals having reversed polarity with respect to each other. In time period -A- of FIG. 4 (*b*), wherein the output of the flip-flop 10 is "0", a transistor 13 is placed in the off state and a transistor 14 also is placed in an off state. Accordingly, the collector voltage of the transistor 14 becomes 2 V as shown by line -b'- in FIG. 4 (*b*), and at the same time a voltage supplied to the common electrode 8 becomes 2 V. Analogue switch 16 is turned on by the reception of a "0" output from the flip-flop 10 and a "1" output from inverter 15, and image signals issued to the terminal 11 (which is 6 V as shown by two-dotted chain line b") in FIG. 4 (*b*) are supplied to the series-parallel transforming circuit 7. Next, in a time period -B- of FIG. 4 (*b*), wherein the output of the flip-flop is "1", the transistors 13 and 14 are both turned on, and the supplied voltage of the common electrode 8 becomes 8 V as shown by real line -b'- in FIG. 4 (*b*). Analogue switch 17 is then turned on by a "1" output from the flip-flop 10 and a "0" output from the inverter 15, and image signals impressed on the terminal 12 (which is 4 V as shown by two dotted chain line -b"- in FIG. 4 (*b*)) are supplied to the series-parallel transforming circuit 7. The series-parallel transforming circuit 7 is for sampling and holding the series of supplied image signals of each picture element as they are and then transforming them to parallel signals. Such transformed signals are then supplied on each X-electrode 4.

In the conventional driving circuit for a liquid crystal display constituted as above-mentioned, the voltages of the common electrode and the X-electrodes together repeat the turning-over in synchronism in response to the start pulse for scanning.

In FIG. 3, when the above-mentioned start pulse for scanning (which is shown in FIG. 4 (A) is supplied to a terminal 18 of the scanning circuit 6, the voltage of the pulse is amplified from a level of 0–5 V to a level of 0–15 V by level shifter 19, and the amplified pulse is supplied to a shift register 20. By receiving such an amplified pulse, the shift register 20 starts a shift action, and it generates pulses for scanning Y-electrodes 5 serially from the top line to the bottom line. FIG. 4 (*c*) shows the voltage of the top line of the Y-electrodes 5, and FIG. 4 (*d*) shows the voltage of the bottom line of the Y-electrodes 5. Such voltages of Y-electrodes correspond to voltages of the gate signals of TFT (thin film transistor) 3.

As shown in FIG. 1 and FIG. 3, the Y-electrodes are respectively connected to the gate electrodes of TFT 3; the X-electrodes are respectively connected to the drain electrodes of TFT 3; and each of one terminal 21 of the liquid crystal cell 1 and the capacitor 2 for memorizing are resectively connected to the source electrodes of the TFT 3. Furthermore, the common electrode 8 is connected to each of other terminals of the liquid crystal cell 1 and the capacitors 2 for memorizing by terminal 21'. The drain electrodes and source electrodes are named as above-mentioned for the convenience of description.

Elucidation is made in detail of the voltages which are impressed on the liquid crystal cell 1 by referring to FIG. 4 (*a*) to FIG. 4 (*j*). FIG. 4 (*a*) shows the start pulse which is impressed on the input terminal 9, which is the start-up signal for scanning and changing of polarity (a vertical synchronization signal separated from the image signal is used ) of flip-flop 10, and the waveform shown by real line -b'- in FIG. 4 (*b*) shows the voltage impressed on the common electrode 8, whereas the waveform shown by two dotted chain line -b"- in FIG. 4 (*b*) shows the voltage of the image signal impressed on the drain electrode of TFT 3, which is a constant luminance signal in one vertical scanning period.

FIG. 4 (*c*) shows the gate voltage impressed on the gate electrode of the TFT 3 on the top line, and FIG. 4 (*d*) shows the gate voltage impressed on the gate electode of the TFT 3 on the bottom line. By such a gate voltage, all of the TFTs 3, 3 . . . are switched on and off. FIG. 4 (*e*), on the other hand, shows the source voltage of TFT 3 on the top line which is impressed on one terminal 21 of the liquid crystal cell 1 and the capacitor 2. During the time period -B- in FIG. 4 (*b*), when the gate voltage of TFT 3 on the top line becomes 15 V (shown in FIG. 4 (*c*)) and TFT 3 turns on, the voltage of the terminal 21 of the liquid crystal cell 1 becomes 4 V, equal to the voltage of image signals -b"-, and such voltage is maintained by the capacitor 2 in spite of the turning off of TFT 3. After that, when the voltage of one terminal 21 of the liquid crystal cell 1, which is connected to the common electrode 8, is decreased by 6 V by the changing of polarity of flip-flip 10, the voltage of another terminal 21' of the liquid crystal cell 1 is also decreased by 6 V by the action of the capacitor 2, and as a result, the voltage becomes −2 V.

Next, during the time period -A- in FIG. 4 (*b*), when the gate voltage of TFT 3 on the top line becomes 15 V (shown in FIG. 4 (*c*)) and TFT 3 turns on, the voltage of the terminal 21 of the liquid crystal cell 1 becomes 6 V as shown by -b''-, and such voltage is maintained even after the turning off of TFT 3. After that, when the voltage of one terminal 21 of the liquid crystal cell 1 is increased by 6 V, the voltage of the other terminal 21' of the liquid crystal cell 1 is also increased by 6 V, and as a result, the voltage becomes 12 V. Such actions are repeated. Accordingly, the voltage impressed across both terminals of the liquid crystal cells 1 on the top line correspond to a voltage of the waveform shown in FIG. 4 (*g*), which is obtained by subtracting the voltage -e- shown in FIG. 4 (*e*) from the voltage -b'- shown in FIG. 4 (*b*).

Namely, whenever tft 3 turns on, the polarity of impressed voltages changes. FIG. 4 (*f*) shows the source voltage of TFT 3 on the bottom line which corresponds to the voltage of the terminal 21 of the liquid crystal cell 1, and when TFT 3 on the bottom line is turned on by the gate voltage shown in FIG. 4 (*d*), the voltage of the image signal -b'- in FIG. 4 (*b*) is supplied to the liquid crystal cell 1. Other actions are the same as described in FIG. 4 (*e*), and the voltage impressed on both terminals of the liquid crystal cell 1 on the bottom line corresponds to a voltage of the waveform shown in FIG. 4 (*h*), which is obtained by subtracting the voltage -f- in FIG. 4 (*f*) from the voltage -b'- shown in FIG. 4 (*b*).

Furthermore, a waveform shown in FIG. 4 (*i*) shows the voltage Vgs between the gate and the source of TFT 3 on the top line, which is given by subtracting the voltage shown in FIG. 4 (*e*) from the voltage shown in FIG. 4 (*c*). The waveform shown in FIG. 4 (*j*) shows the voltage Vgs between the gate and the source of TFT 3 on the bottom line, which is given by subtracting the voltage shown in FIG. 4 (*f*) from the voltage shown in FIG. 4 (*d*).

The voltage of an image signal maintained by the capacitor 2 for memorizing is, however, discharged with RC time current determined by the capacitance of the memory capacitor 2 and the resistance of TFT 3 when TFT 3 is off. Since the capacitance of this memory capacitor 2 is as small as 1 pF, a current ratio of ON vs OFF of TFT 3 of about $10^6$ is needed for maintaining the voltage of image signals at a nearly constant value during one scanning period in order to correspond to the repetition period of the gate voltage of transistor 14 in FIG. 2. This is shown in FIG. 4 (*c*) and (*d*). On the other hand, a cut-off voltage of TFT 3 which is needed to make TFT 3 turn off is Vgs = −3 V. If Vgs is higher than −3 V, it is impossible to maintain the voltage of image signals constant because electric current flows to TFT 3 and the time current for discharging becomes smaller.

Accordingly, in the above-mentioned case, when Vgs on the top line shown in FIG. 4 (*i*) becomes 2 V, the electric current flows to TFT 3 and a change of voltage as shown by the dotted line in FIG. 4 (*e*) occurs in the source a voltage. As a result, voltage drop shown by the dotted line in FIG. 4 (*g*) occurs in the voltage impressed across both terminals of the liquid crystal cell 1 on the top line, and the luminance level in such part also changes. Similarly, when Vgs on the bottom line shown in FIG. 4 (*j*) becomes 2 V, the electric current flows to TFT 3 too, and a voltage change as shown by the dotted line in FIG. 4 (*f*) occurs in the source voltage. As a result, a voltage drop shown by the dotted line in FIG. 4 (*h*) occurs in the voltage impressed across both terminals of the liquid crystall cell 1 on the bottom line, and the luminance level in such part also changes.

As mentioned above, by comparing the waveforms shown in FIG. 4 (*g*) and (*h*), it is known that the voltage drop of the luminance level on the bottom part lines is larger than that of the top lines, because of a longer time period for electric current flowing to TFT 3. As a result, the conventional driving circuit for a liquid crystal display has a shortcoming of inclination of luminance from the upper part to the lower part of the display.

SUMMARY OF THE INVENTION

In view of the above-mentioned shortcoming, the purpose of the present invention is to provide an improved driving circuit for a liquid crystal display without inclination of luminance from the upper part to the lower part.

Such a driving circuit for liquid crystal display in accordance with the present invention comprises:

voltage changing means coupled to first and second voltage supplies and to common electrodes of respective liquid crystal cells for alternating the polarity of a voltage applied across the resspective liquid crystal cells, polarity alternating means coupled to image signal input terminals of the driving circuit for alternating the polarity of a driving voltage, which corresponds to image signals to be applied to other electrodes of the liquid crystal cells, synchronously with the voltage alternation of the voltage changing means, plural transistors each connected by its source electrode to one of the other electrodes of the respective liquid crystal cells, by its drain electrode to output terminal, of the polarity alternating means, and by its gate electrode to receive respective gate signals, and gate voltage generating means coupled to the gate electrodes of the plural transistors for generating the gate signals, each having a lowest voltage which is lower than a voltage made by subtracting the amplitude voltage of the common electrode from the lowest voltage in the driving voltage, and for applying the gate signals to the gate electrodes.

DETAILED DESCRIPTION OF THE PREFERRED EMBODIMENT

A preferred embodiment of the driving circuit for a liquid crystal display in accordance with the present invention is described in the following referring to FIG. 5, FIG. 6 (*a*), FIG. 6 (*b*), FIG. 6 (*c*), FIG. 6 (*d*), FIG. 6 (*e*), FIG. 6 (*f*), FIG. 6 (*g*), FIG. 6 (*h*), FIG. 6 (*i*) and FIG. 6 (*j*).

Figure 5:
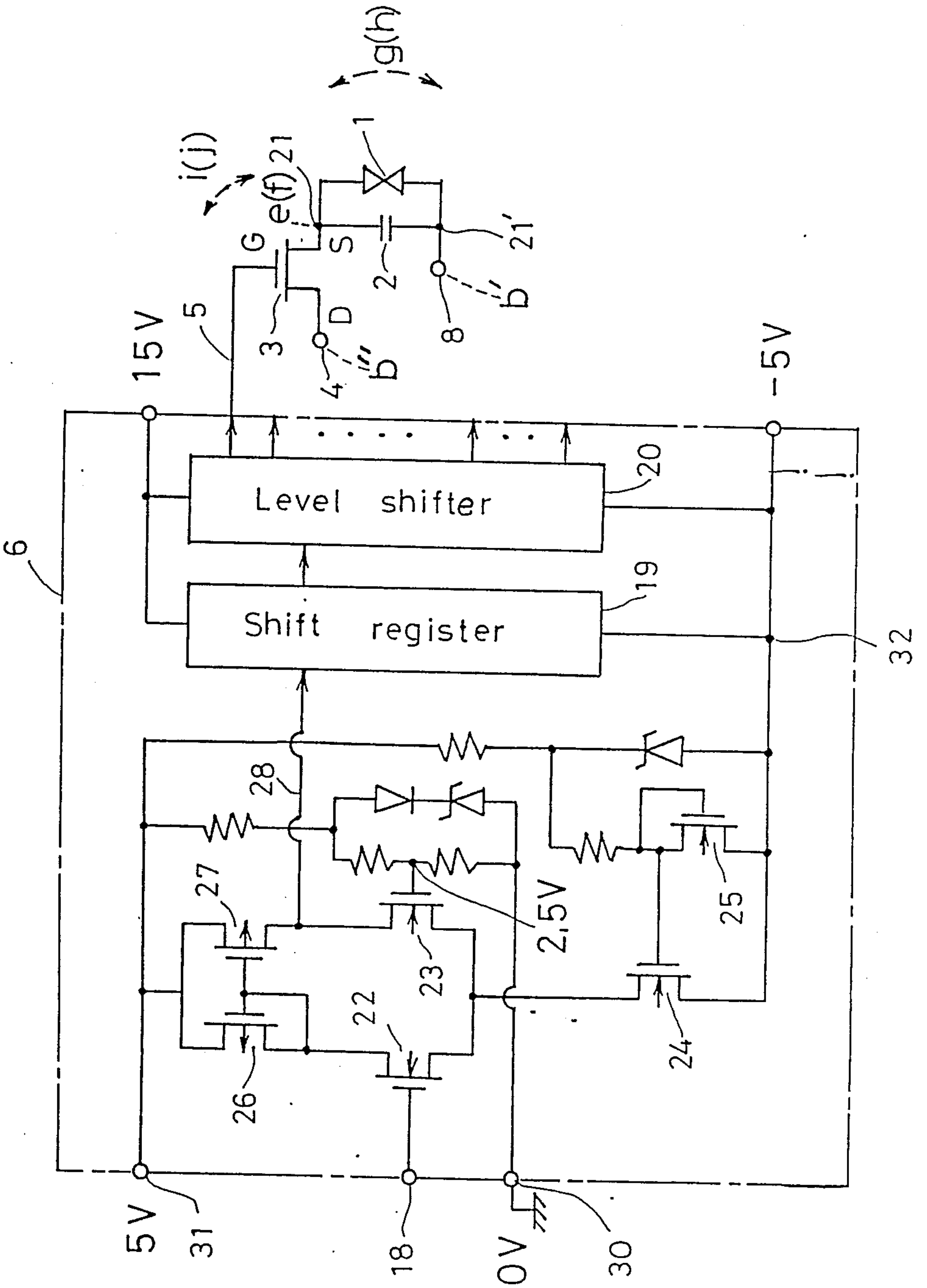
FIG. 5 is a circuit diagram showing a driving circuit for a liquid crystal display in accordance with the present invention.

FIG. 5 shows an embodiment of a driving circuit for a liquid crystal display in accordance with the present invention, especially of a gate voltage generating circuit for driving Y-electrodes of the liquid crystal display.

Figure 1:
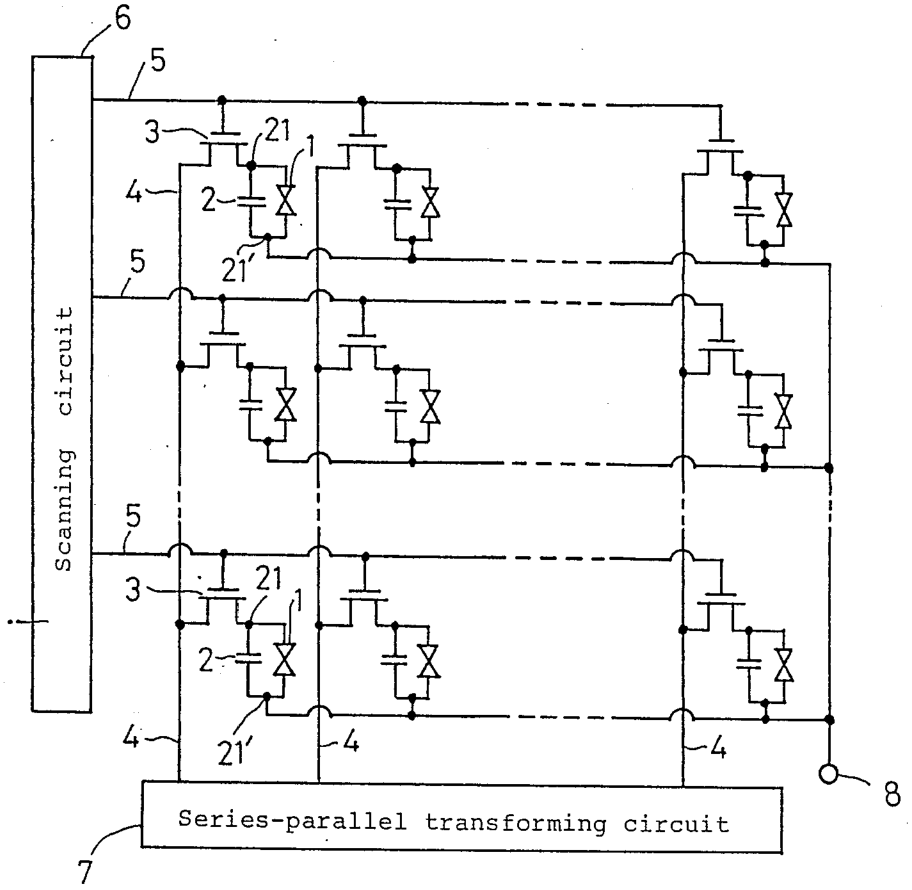
FIG. 1 (Prior Art)
FIG. 1 is a circuit diagram showing the generally used active-matrix type liquid crystal display.
Figure 2:
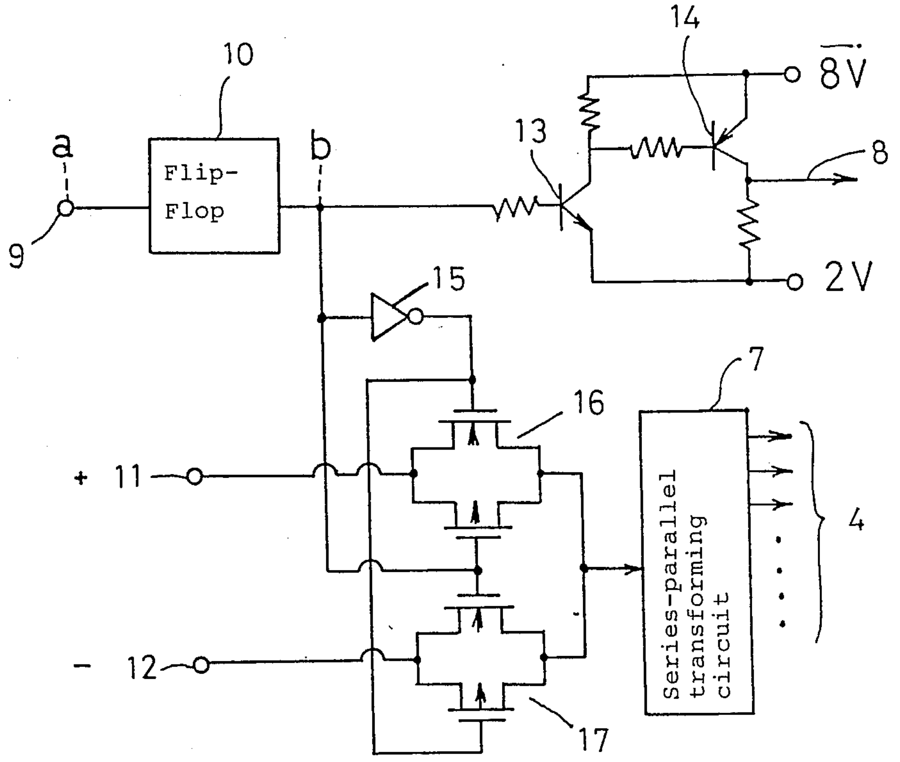
FIG. 2 (Prior Art)
FIG. 2 is a circuit diagram showing the conventional driving circuit for X-electrodes and the common electrode of the liquid crystal display.
Figure 3:
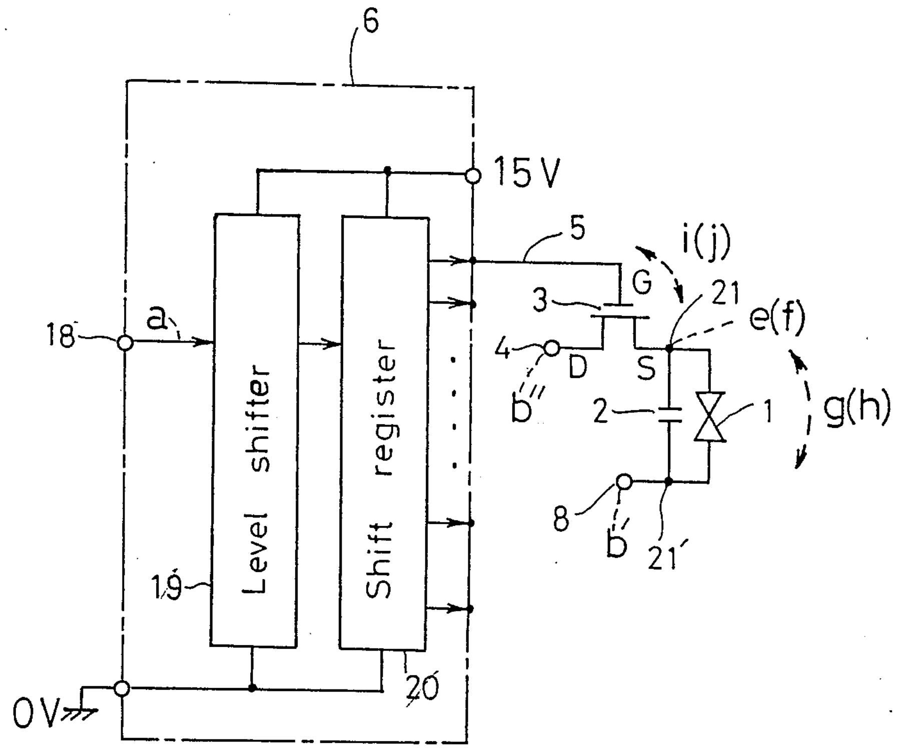
FIG. 3 (Prior Art)
FIG. 3 is the circuit diagram showing the conventional driving circuit for the Y-electrode of the liquid crystal display.
Figure 4:
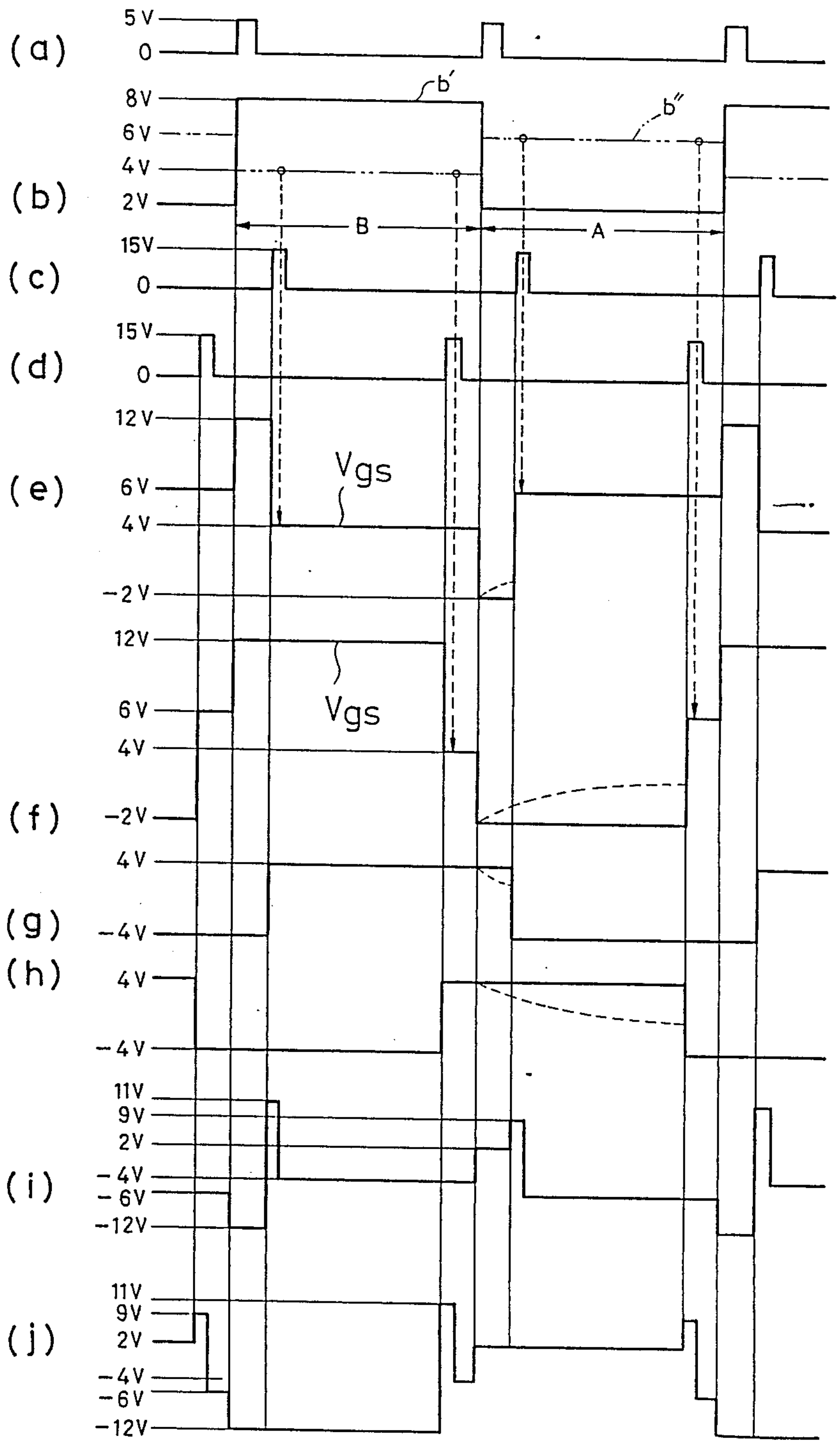
FIG. 4 (PRIOR ART)
FIG. 4 (*a*), FIG. 4 (*b*), FIG. (*c*), FIG. 4 (*d*), FIG. 4 (*e*), FIG. 4 (*f*), FIG. 4 (*g*), FIG. 4 (*h*), FIG. 4 (*i*), and FIG. 4 (*j*) are the time charts showing waveforms on various points of the driving circuits shown in FIG. 2 and FIG. 3.

In FIG. 5, transistors 22, 23, 24, 25, 26 and 27 constitute a voltage shifting circuit for changing the voltage range 0–5 V between points 30 and 31 to −5–5 V between point 32 and line 28. A level shifter 20 is a circuit for shifting the voltage range from −5–5 V to −5–15 V. A shift register 19 is a circuit for consecutively generating voltages of gate signals changing from a lowest voltage of −5 V to a highest voltage of 15 V, and such gate signals are consecutively applied to the Y-electrodes of the liquid crystal display in a manner such as for scanning as shown in FIG. 1.

The driving circuit for Y-electrodes of the liquid crystal display in accordance with the present invention is constituted as mentioned above. Details of constitution and action are described in the following.

At first, a start pulse (0–5 V) mentioned above (shown in FIG. 6 (*a*)) is supplied to terminal 18. N-channel MOS FETs (Metal Oxide Semiconductor Field Effect Transistors) 22 and 23 are constituted as a differential amplifier, with the gate electrode of MOST FET 22 connected to terminal 18, and the gate electrode of MOS FET 23 supplied with a reference voltage of 2.5 V. A MOS FET 24 serves as a current source which flows electric current to the differential amplifier, and a MOS FET 25 is connected to MOS FET 24 for constituting a current mirror. Sources of MOS FETs 24 and 25 are connected to a terminal which is impressed with a voltage of −5 V. P-channel MOS FETs 26 and 27, on the other hand, constitute a current mirror type load circuit.

Figure 6:
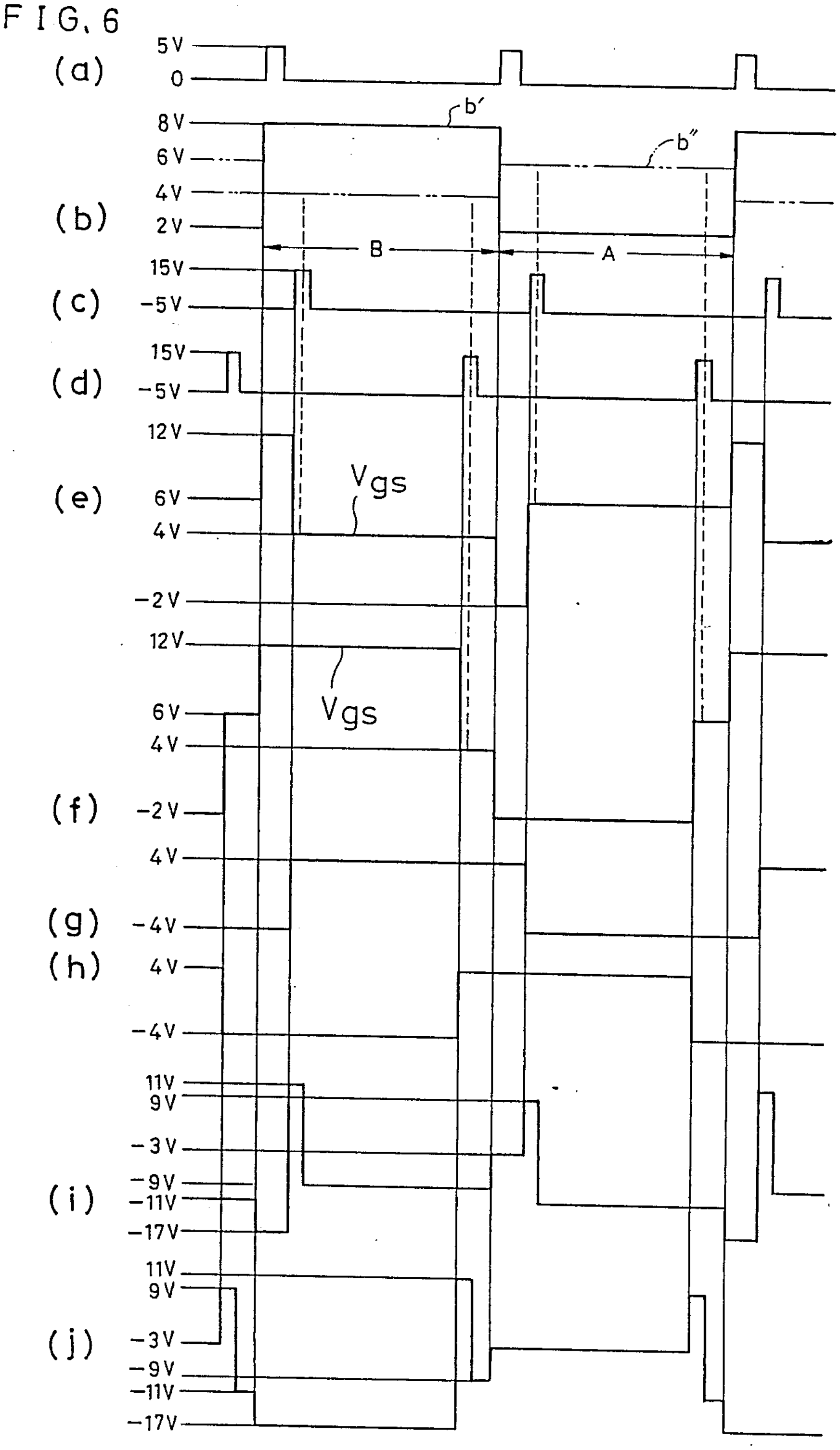
FIG. 6 (*a*), FIG. 6 (*b*), FIG. 6 (*c*), FIG. 6 (*d*), FIG. 6 (*e*), FIG. 6 (*f*), FIG. 6 (*g*), FIG. 6 (*h*), FIG. 6 (*i*), and FIG. 6 (*j*) are time charts showing waveforms on various points of the driving circuit shown in FIG. 5.

When a start pulse "a" of 5 V as shown in FIG. 6 (*a*) is supplied to the terminal 18, the MOS FET 22 turns on, the MOS FET 23 turns off, MOS FETs 26 and 27 turn on and the voltage of output line 28 becomes 5 V. Also, when a voltage of 0 V is supplied to the terminal 18, the MOS FET 22 turns off, the MOS FET 23 turns on, the MOS FETs 26 and 27 turn off, and the voltage of output line 28 becomes −5 V. As mentioned above, the voltage in a region from 0 to 5 V is supplied on the terminal 18, and the voltage of a region from −5 to 5 V is outputted on the output line 28. As voltage regions of power source of the level shifter 19 and shift register 20 are set to a voltage of from −5 to 15 V, a voltage in the range of from −5 to 5 V of output voltage on the output line 28 is amplified as −5 to 15 V by a level shifter 19, and the shifter register 20 generates voltages for gate signals in a manner for scanning the Y-electrodes 5 (in FIG. 5 the Y-electrodes are abbreviated as only one, but really they are constituted as a matrix as shown in FIG. 1) from top to bottom.

FIG. 6 (*a*) to FIG. 6 (*j*) are waveforms showing the voltage changes at several points of the driving circuit and the liquid crystal display. FIG. 6 (*a*) shows the start pulse which is impressed on the input terminal 18, and is a start-up signal for scanning and changing of polarity (such as a vertical synchronization signal separated from an image signal issued). The waveform is shown by real line -b'- in FIG. 6 (*b*) and shows the voltage impressedd on the common electrode 8, whereas the waveform shown by two dotted chain line -b"- in FIG. 6 (*b*) shows the voltage of the image signal impressed on the drain electrode of TFT 3 for the case of a constant luminance signal in one vertical scanning period. FIG. 6 (*c*) shows the gate voltage impressed on the gate electrode of the TFT 3 on the top line. By such gate voltage, all of the TFTs 3, 3 . . . are switched on and off. FIG. 6 (*e*) shows the source voltage of TFT 3 on the top line which is impressed on one terminal 21 of the liquid crystal cell 1 and the capacitor 2. During the time period -B- in FIG. 6 (*b*), when the gate voltage of TFT 3 on the top line becomes 15 V (shown in FIG. 6 (*c*)) and TFT 3 turns on, the voltage of the terminal 21 of the liquid crystal cell 1 becomes 4 V, equal to the voltage of image signals -b"-, and such voltage is maintained by the capacitor 2 in spite of the turning off of TFT 3. After that, when the voltage of terminal 21 of the liquid crystal cell 1, which is connected to the common electrode 8, is decreased 6 V by the changing of polarity, the voltage of terminal 21' of the liquid crystal cell 1 is also decreased 6 V by the action of the capacitor 2, and as a result, the voltage becomes −2 V.

Next, during the time period -A- in FIG. 6 (*b*), when the gate voltage of TFT 3 on the top line becomes 15 V (shown in FIG. 6 (*c*)) and TFT 3 turns on, the voltage of the terminal 21 of the liquid crystal cell 1 becomes 6 V as shown by -b"-, and such voltage is maintained in spite of the turning off of TFT 3. After that, when the voltage of terminal 21 of the liquid crystal cell 1 is increased by 6 V, the voltage of the other terminal 21' of the liquid crystal cell 1 is also increased 6 V, and as a result the voltage becomes 12 V. Such actions are repeated. Accordingly, the voltage impressed across both terminals of the liquid crystal cell 1 on the top line corresponds to a voltage having a waveform shown in FIG. 6 (*g*), which is given by substracting the voltage -e- shown in FIG. 6 (*e*) from the voltage -b- shown in FIG. 6 (*b*). Namely, whenever TFT 3 turns on, the polarity of the impressed voltages changes.

FIG. 6 (*f*) shows the source voltage of TFT 3 on the bottom line which corresponds to the voltage of the terminal 21 of the liquid crystal cell 1, and when TFT 3 on the bottom line is turned on by the gate voltage shown in FIG. 6 (*d*), the voltage of the image signal -b'- in FIG. 6 (*b*) is supplied to the liquid crystal cell 1. Other actions are the same as shown in FIG. 6 (*e*), and the voltage impressed on both terminals of the liquid crystal cell 1 on the bottom line corresponds to a voltage of the waveform shown in FIG. 6 (*h*), which is given by subtracting the voltage f in FIG. 6 (*f*) from the voltage -b'- shown in FIG. 6 (*b*).

Furthermore, a waveform shown in FIG. 6 (*i*) shows the voltage Vgs between the gate and the source of FIG. 5 on the top line, which is given by subtracting the voltage shown in FIG. 6 (*e*) from the voltage shown in FIG. 6 (*c*). A waveform shown in FIG. 6 (*j*) shows a voltage obtained by subtracting the voltage shown in FIG. 6 (*f*) from the voltage shown in FIG. 6 (*d*), which is the voltage Vgs between the gate and the source of TFT 3 on the bottom line. Thus, when the gate voltage shown in FIG. 6 (*c*) and (*d*) is at its lowest voltage, Vgs shown in FIG. 6 (*i*) and FIG. 6 (*j*) is below −3 V, by which the cutoff voltage of TFT 3 in FIG. 1 is maintained. Accordingly, the source voltage shown in FIG. 6 (*e*) and FIG. 6 (*f*) do not change, and the voltage impressed across both terminals of the liquid crystal cell 1 also do not change. Therefore, the inclination of luminance from the upper part to the lower part of the display does not occur.

As mentioned above, such an embodiment of a driving circuit for a liquid crystal display in accordance with the present invention has a gate voltage generating apparatus for generating a gate voltage having a lowest voltage lower than a voltage which is made by subtracting the voltage amplitude of the common electrode from the lowest voltage in the image signals. Therefore, even if the source voltage is decreased by reversing of the voltage of the common electrode, the change of voltage supplied across both terminals of the liquid crystal cell and the inclination of luminance of the display can be eliminated by impressing the lowest voltage of the gate signals so as to assure the cut-off state of the TFT 3.

In the given embodiment, the lowest voltage of the gate voltage is set to be negative. However, if the lowest voltage of the gate voltage is lower than a voltage made by subtracting the amplitude voltage of the common electrode from the lowest voltage in the image signals, the similar operation is obtainable only by raising the voltages of the image signals and common electrode instead of lowering the lowest voltage of the gate voltage. Nevertheless, the aforementioned lowering of the lowest voltage of the gate voltage is superior in that a low voltage and low electric power consumption are possible.

What is claimed is:

1. A driving circuit for a liquid crystal display, comprising:

voltage changing means coupled to first and second voltage supplies and to common electrodes of respective liquid crystal cells for alternating the polarity of a voltage applied across said respective liquid crystal cells, polarity alternating means coupled to image signal input terminals of said driving circuit for alternating the polarity of a driving voltage, which corresponds to image signals to be applied to other electrodes of said liquid crystal cells, synchronously with said voltage alternation of said voltage changing means, plural transistors each connected by its source electrode to one of said other electrodes of said respective liquid crystal cells, by its drain electrode to output terminals of said polarity alternating means, and by its gate electrode to receive respective gate signals, and gate voltage generating means coupled to said gate electrode of said plural transistors for generating said gate signals, each having a lowest voltage which is lower than a voltage made by subtracting an amplitude voltage of said common electrode from the lowest voltage in said driving voltage, and for applying said gate signals to said gate electrodes.

2. A driving circuit for a liquid crystal display in accordance with claim 1, wherein said transistors are thin film transistors.

* * * * *